(12) United States Patent
Ballesteros

(10) Patent No.: US 6,399,128 B1
(45) Date of Patent: Jun. 4, 2002

(54) INJECTION OF FOODSTUFF TO FILL BAGELS AND BREADS

(75) Inventor: Timothy A. Ballesteros, Hawthorne, NJ (US)

(73) Assignee: The Sandwich Factory, Co., West Windsor, NJ (US)

( * ) Notice: Subject to any disclaimer, the term of this patent is extended or adjusted under 35 U.S.C. 154(b) by 819 days.

(21) Appl. No.: 08/654,536

(22) Filed: May 29, 1996

(51) Int. Cl.[7] .............................................. A21D 13/00
(52) U.S. Cl. .................. 426/283; 426/94; 426/275; 426/281; 426/282; 426/284; 426/496
(58) Field of Search ................................ 426/275, 279, 426/281, 282, 283, 284, 94, 496

(56) References Cited

U.S. PATENT DOCUMENTS

| | | | |
|---|---|---|---|
| 3,615,675 A | 10/1971 | Wisdom et al. | 99/83 |
| 3,656,968 A | 4/1972 | Allen | 99/87 |
| 3,666,485 A | 5/1972 | Nelson et al. | 99/88 |
| 3,802,824 A | 4/1974 | Amster et al. | 425/371 |
| 3,880,567 A | 4/1975 | Raichel | 425/364 |
| 4,020,184 A | 4/1977 | Chesner | 426/19 |
| 4,147,809 A | 4/1979 | Thompson | 426/499 |
| 4,251,201 A | 2/1981 | Krysiak | 425/132 |
| 4,343,603 A | 8/1982 | Pavlow et al. | 425/114 |
| 4,618,499 A | * 10/1986 | Wainwright | 426/283 |
| 4,794,009 A | 12/1988 | Dreisin | 426/283 |
| 4,963,377 A | * 10/1990 | Rimmeir | 426/283 |
| 4,966,781 A | 10/1990 | Artzer | 426/280 |
| 5,069,921 A | * 12/1991 | Madanat | 426/283 |
| 5,185,167 A | 2/1993 | Schwartz | 426/94 |
| 5,236,724 A | * 8/1993 | Burger | 426/19 |
| 5,312,633 A | 5/1994 | Schwartz | 426/94 |
| 5,409,717 A | 4/1995 | Apicella et al. | 426/19 |

OTHER PUBLICATIONS

Edhard Pamphlet [Volumetric Metering Systems for Food, Cosmetic and Chemical Industries] No Date.
Edhard Pamphlet [Describing Part Numbers, Names, Descriptions and Capacities] No Date.
Rheon Company (Japan) brochure for Salad Injector—Catalog No. S–FOID–017–6D, 1994.

* cited by examiner

Primary Examiner—Lien Tran
(74) Attorney, Agent, or Firm—Gibbons, Del Deo, Dolan, Griffinger & Vecchione

(57) ABSTRACT

Method of filling a bagel or a bread product having a hardened outer surface and softer interior. The outer surface is broken by the sharpened end of a filling spout. The bagel or bread product is moved relative to the spout to shroud the spout and push aside the softer interior. The spout eventually extends most of the length of the bagel or bread product, but its sharpened end is not positioned to break through. The bagel or bread product is moved relative to the spout in the opposite direction to a partially withdrawn position. Foodstuff is injected through the spout and into the channel formed at the partially withdrawn position. The bagel or bread product is further withdrawn and foodstuff is injected again. Finally, the bagel or bread product is withdrawn sufficiently to separate from the spout.

9 Claims, 3 Drawing Sheets

INJECTION OF FOODSTUFF TO FILL BAGELS AND BREADS

BACKGROUND OF THE INVENTION

1. Field of the Invention

The invention relates to filling bagels and breads by injection of foodstuffs where the outer surface of the bagel or bread is cooked or baked so as to be harder than the interior at the time of filling.

2. Discussion of Related Art

Bagels are made by a process which creates a doughnut or toroidal shaped bakery product having a hard outer crust with a distinctive "bagel" taste. Such products are characteristically cut open by slicing them across their width on a plane perpendicular to the axis of the toroid and spreading cream cheese or the like on them.

The hard crust requires that the slicing be done with a sharp knife, which can be hazardous, or by tearing the product in half with the hands. Such a tearing maneuver is usually awkward and does not result in the desired planar cut.

Spreading the cream cheese on the sliced bagel can be tedious, especially when the cheese is cold and has been stored in a refrigerator of course, bagel stores or delicatessens have spread many other types of foods on the sliced bagel that are more easily spreadable than cold cream cheese.

Bagels are made from a yeast dough, which is first boiled in water to close the pores of the dough, then baked in a hot oven to turn the crust golden brown. The dough is worked on a flour board and set in a warm place to rise, then kneaded again before being formed into rings. The rings are formed from balls of the risen dough, either by poking a hole through the center of each ball or by rolling each ball into a long strip, shaping it into a ring and then pressing the ends together.

If the dough is kept in a long strip rather than shaped subsequently into a ring, it appears cylindrical—it may be sliced after baking to reveal an open face and foodstuffs may be spread on this open face.

Nevertheless, one of the problems associated with eating a sliced bagel with foodstuff spread is that the foodstuff spread may spill out. This is particularly troublesome to a child, who may not take sufficient care to prevent spillage and wind up spilling the spread over his/her clothing. Even a hurried commuter could wind up spilling spread on clothing while biting into the bagel. Similar problems of spillage arise with elongated breads that are sliced longitudinally with a spread applied to their open faces. Therefore, it would be desirable to provide foodstuff spread onto a bagel or bread product in a manner that avoids the risk of spillage of the spread while the bagel is being eaten.

Filling of bakery products such as donuts or other pastries through injection from a spout or nozzle is known and equipment is available from manufacturers such as Edhard Corporation of Harrison, N.J. Edhard sells power bases (server P and PS) and interchangeable filler units (Servers–F, FS, RP) and recommends a list of dispensable foodstuffs, such as eggs, butter, cream cheese and tomato paste. To fill donuts or croissants, the spout or nozzle is shrouded by the donut or croissant and then the filling is injected through the spout or nozzle into the interior. For non-pastry items such as breads, its catalog shows a bread roll sliced and then buttered by dispensing the butter onto the sliced open face. It does not show injection of foodstuff into the bread.

SUMMARY OF THE INVENTION

One aspect of the invention lies in a method of filling bagels or breads with foodstuff. The bagel or bread product has an outer surface and a softer interior. This interior is softer than and bounded by the outer surface. The outer surface is harder because the bagel or bread product is fully or partially cooked or baked. The method comprises the steps of:

(a) moving at least one of the bagel or bread product and the spout relative to each other in a withdrawing direction to leave a portion of a channel free of the spout, the channel extending in a direction of elongation of the outer surface of the bagel/bread;

(b) filling the portion of the channel with foodstuff by injecting the foodstuff through an end of the spout that faces the portion of the channel so that the foodstuff fills the portion of the channel; and (c) separating the filled bagel or bread product from the spout by moving at least one of the bagel/bread and the spout relative to each other in the withdrawing direction.

Preferably, the filling takes place as the bagel or bread product is being withdrawn from the spout in stages: the foodstuff is squirted or discharged from the spout at each stage along the length of the bagel or bread product so that the foodstuff dispenses into the open channel to fill it up.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
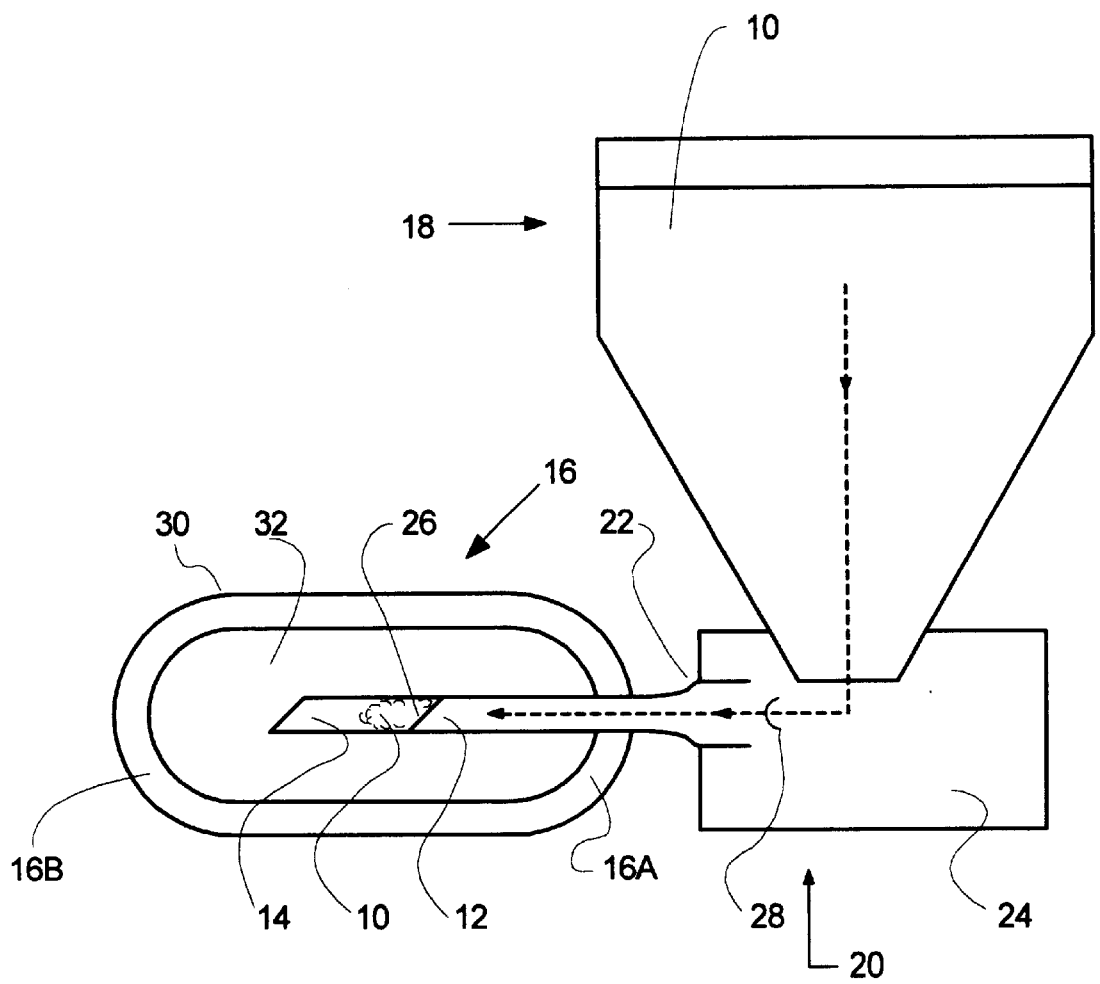
FIG. 1 illustrates in schematic form the filling of a bagel or a bread with dispensable foodstuff in accordance with the invention.

FIG. 1 shows dispensable foodstuff 10 discharging from a spout 12 into an open channel 14 of a bagel or bread 16 that has two ends 16A, 16B. The bagel or bread is elongated, for instance, cylindrically shaped, with either flat or rounded ends. The foodstuff is held within an interchangeable container 18 of a foodstuff dispensing machine 20. The foodstuff dispensing machine is exemplified by Edhard model PS 4028 power base with FS 5009 Filler Unit single spout and stainless steel hopper.

The procedure involves the following: First, a suitable spout 12 is attached via connection 22 to the base 24 for dispensing foodstuff 10. The spout 12 preferably has a sharpened or inclined end 26 as is known from spout F-3090 of Edhard. The spout may be formed to suit the food item being filled, e.g., its length and diameter may be custom manufactured accordingly.

Next, an appropriate foodstuff is filled into the interchangeable container 18. Any number of interchangeable containers may be filled each with its own foodstuff. The foodstuff may be any food item that is dispensable; it may require preparation to place it in a condition for dispensing, but is no different in texture than the spreads commonly employed on sliced bagels.

The container 18 filled with the desired foodstuff is then inserted into place in the base 24 of the foodstuff dispensing machine 20. With the power on, everything is ready to begin filling the cylindrical bagels. A dashed line 28 with arrows show the direction of travel of the foodstuff 10.

One end 16A of the cylindrical baked bagel 16 is forced against the sharpened end 26 of the spout 12, resulting in its crust or outer surface 30 breaking and rendering the softer interior 32 accessible. The cylindrical baked bagel 16 is then pushed relative to the spout 16 such that it shrouds the spout 12 by most of its length: it is preferable that the cylindrical baked bagel not be pushed so far that the sharpened end 36 breaks through the opposite end 16B of the cylindrical baked bagel.

The bagel or bread 16 may be pushed onto the spout 12 until the sharpened end reaches, but does break through, the crust at the opposite end 16B. In so doing, the spout 12 in effect pushes the softer interior to the side because of the incline of the sharpened end 26 to form a channel 14 filled by the spout 12. The channel 14 thus has a border that consists of this softer interior being in a pushed aside condition. The bagel or bread 16 is then pulled in the opposite direction to traverse a distance. This distance depends on two criteria: it should be sufficiently short so that dispensing the foodstuff from the spout will fill up the entire distance in the channel and should be sufficiently long that the foodstuff may dispense through injection without blockage of the spout. A distance of 1–3 inches is adequate.

After dispensing the foodstuff 10, the bagel or bread is pulled again by about the same distance in the same direction as before to expose another portion of the channel open between the nozzle and the previously injected foodstuff. From this position, the foodstuff is squirted or injected or otherwise dispensed from the spout 12 to fill up this newly exposed void.

The bagel or bread is pulled again in the same manner to repeat the filling procedure until eventually the end 16A of the bagel or bread 16 is completely separated from the spout 12 and the channel 14 is completely filled with dispensed foodstuff 10.

The next customer may desire a different foodstuff, in which case the container is exchanged with another in a known manner. Each container should have its own nozzle to avoid the need for cleaning the nozzle after each use as would be necessary to avoid mixing foodstuffs during dispensement.

The filling procedure involving the steps of partially withdrawing, dispensing, further withdrawing, dispensing, etc. may be replaced by simultaneously dispensing during gradual continuous withdrawing, but this technique is more difficult to master because the channel "void" being filled at any given time is much smaller in volume, which means there is a greater tendency for the dispensing of foodstuff to become blocked due to the lack of free space in the channel.

The present invention may be used to fill baked breads having a hardened outer crust with a softer interior such as French breads and Italian breads. Such breads are generally somewhat wider at their centers that at the ends, but are elongated. The filling procedure would be identical to that described previously.

While not intended to be limiting, the type of foodstuffs that may be used include spreads of cream cheese, chicken salad, scrambled egg and cheese, butter, egg salad, tuna fish salad—just to name a few of the more popular kinds of spreads.

Preferably, the outer surface or crust of the bagel or bread being filled is harder than its interior. This allows the bagel or bread to be handled by its crust without risk of deforming its shape through handling or injection. In addition, the hardened crust serves as a barrier that prevents the softer interior from deforming the crust as the spout pushes the softer interior to the side in preparation for injection. A softer crust may allow the shape of the bagel or bread dough to deform in an undesired fashion.

The bagel or bread need not be fully baked prior to foodstuff injection; it is sufficient if some baking has taken place to render the outer surface harder than the softer interior. Thereafter, baking may be completed.

The baked or cooked condition for purposes of this invention encompasses any cooking that has produced an outer surface that is harder than the interior. Thus, boiling, steaming or oven baking would generate a cooked or baked product applicable to the invention. The optimal condition for foodstuff injection filling arises, however, after at least two minutes of oven baking.

Of course, the amount of oven baking needed for completion of the baking process in a manner satisfactory for bagel, delicatessen or convenience store sale should not be so great that the foodstuff itself transforms into a liquid state during the baking process and spills out of the injection opening. Also, many customers prefer that the foodstuff be at room temperature or cooler than the warm or hot bagel. Therefore, the bagel or bread should be as close to being in a fully baked condition as possible before foodstuff injection is effected.

Suppliers may stop the cooking or baking process before reaching the fully baked condition. At such an intermediate stage, the bagel or bread dough may be filled and then shipped refrigerated to a convenience store for final baking at the time of purchase. Thus, the cooked or baked condition as envisioned by the present invention is intended to cover such an intermediate stage, although the bagel or bread may only have been partially steamed or boiled and perhaps not even oven baked at all. Of course, the cooked or baked condition also covers the final stage where the bagel or bread is completely oven baked. In all cases, however, the outer surface is harder than the interior. Therefore, the degree to which cooking or baking has been carried out or the degree to which a crust forms within the usual meaning of that term in the trade is not intended to be dispositive of the scope of the invention. It is simply whether the outside surface of the bagel or bread product has been cooked and/or baked sufficiently to be harder than the interior.

For purposes of this invention, a "bagel product" refers to any bagel dough that has been at least partially cooked and/or baked to have a harder outside surface than the interior. A "bread product" applies to any bread dough that has been at least partially cooked or baked to have a harder outside surface than the interior. In the preferred embodiment, the bagel or bread product to be filled is elongated.

Figure 2:
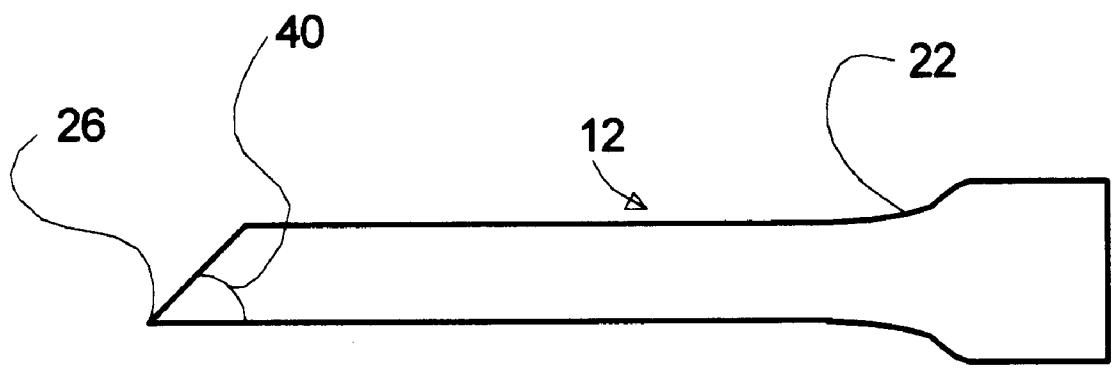
FIG. 2 illustrates in schematic form a side view of the spout in accordance with the invention.

FIG. 2 shows the spout 12 in greater detail; the spout is made preferably of stainless steel. The angle 40 is preferably thirty degrees. Edhard Corporation typically uses an angle of 20–25 degrees for their spouts, but such an angular range was problematic for use in the present invention because the foodstuff collected at the spout opening after withdrawal of the spout from the bagel. This excess foodstuff that collected spread onto the outside of the next bagel that shrouded the spout—too messy for commercial applications. Nevertheless, the method of filling in accordance with the invention is not intended to exclude the use of such a spout.

By increasing the angle to thirty degrees, however, the results were satisfactory in that the foodstuff did not appreciably collect at the spout opening to mess the outside of the next bagel with excess foodstuff during shrouding of the spout. The angle of the spout opening should be kept small to ensure that the inclination angle of the sharpened end 26 is sufficiently sharp for cutting through the crust. Of course, if the spout is not used to initially cut into the bagel (i.e., another sharpened tool is used instead), then there is no need to keep the inclination angle small. The preferred diameter of the spout may depend upon the viscosity of the foodstuff being dispensed. For instance, a ⁹⁄₁₆" diameter is suitable for cream cheese while a ⁷⁄₁₆" diameter is suitable for butter.

As an alternative, the bagel or bread may be baked with the channel already made, in which case the outer surface would define the channel. Such a channel may be filled with foodstuff by injection in the manner of the invention, e.g., through withdrawal of the bagel/bread from the spout in stages. Of course, the spout will not need to break the outer surface because the channel was formed in the baked condition.

Figure 3:
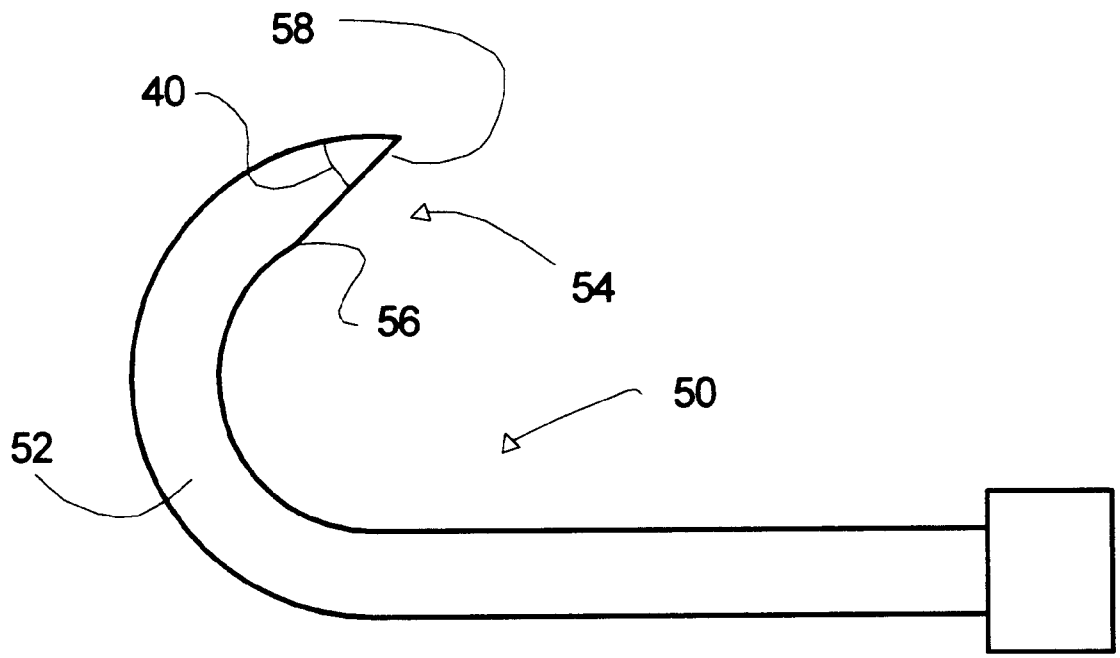
FIG. 3 illustrates in schematic form a variation on the spout of FIG. 2 in which the spout is curved.

FIG. 3 shows a further variation of the spout of FIG. 2 in which the spout 50 has a portion 52 that is curved, causing the spout to have a hooked appearance. The open distal end 54 of the spout is angled such that the inner radial side 56 is shorter than the outer radial side 58, preferably providing the same angular sweep as for the angular sweep 40 of the spout embodiment of FIG. 2 and for the same reasons. The radius of curvature of the curved portion 52 preferably is the same as the radius of curvature of conventional toroid (round) bagels. The filling process is effected the same way as for the cylindrically shaped bagel of the embodiment of FIG. 1.

In the case of FIG. 3, however, the toroid bagel is positioned so that its curvature is in the same plane as the curvature of the curved portion 52. While keeping the planes of curvature in alignment, the center of the toroid bagel is shrouded onto the outer radial side 58, which pierces into the same. By directing the outer radial side 58 in the direction of curvature of the toroid bagel, the curved portion 52 fully inserts into a semicircular half of the toroid bagel, perhaps pushing aside the softer interior to define a curved channel. The toroid bagel is then withdrawn in stages, with the foodstuff being dispensed by means of injection into the curved channel, until withdrawal is complete. The same procedure is effected thereafter on the other semicircular "half" of the toroid bagel, perhaps through the same pierced opening except that the bagel is flipped over so that the spout 50 inserts into the unfilled bagel half.

Of course, the radius of curvature of the spout need not be fully semicircular as shown; a lesser angular sweep may be satisfactory, e.g., a quarter circle. The number of shroudings would need to be multiplied accordingly to completely fill the bagel. For instance, is the angular sweep is a quarter circle, then four shroudings would be necessary, perhaps at two opposite pierced openings while filling in opposite directions by flipping the bagel over each time.

Instead of flipping the bagel over after injecting the foodstuff the first time, the spout may be flipped over to dispense the foodstuff through the pierced opening in the bagel but in the opposite direction from the first time.

Aside from the different shape of the toroid-shaped bagel over a cylindrical bagel and the difference in the spout shape, the entire discussion concerning the cylindrical bagel or breads is applicable to the toroid bagel and construction of the curved spout. For example, the toroid bagel may be any type of bread product having a harder exterior than interior; the channel formed from the curved spout may be within the soft interior of the bagel or be formed prior to cooking so that it is hardened beforehand; and the withdrawal and injection may be done in stages during the withdrawal, simultaneously with the withdrawal or just once at the opening (such as where the injection power is strong enough for the foodstuff to fill the channel). While only one opening in the surface of the bagel should be needed fully fill two curved channels formed with the spout of FIG. 3, it could of course be done with two diametrically opposite openings.

Alternatively, the toroid bagel could be filled by using the straight spout of FIG. 2 instead of the curved spout of FIG. 3 and in accordance with the teaching of the embodiment of FIG. 1, but the filling may not be as centered as would be the case with the curved spout of FIG. 3 and further may require that more openings be made in the outer surface to provide the same level of filling per volume as the curved spout provides with the curved channel it forms.

While the foregoing description and drawings represent the preferred embodiments of the present invention, it will be understood that various changes and modifications may be made without departing from the spirit and scope of the present invention.

What is claimed is:

1. A method of filling a channel within an elongated bagel product with foodstuff, the bagel product having an outer surface and having a softer interior that is softer than and bounded by the outer surface, the method comprising the steps of:

(a) positioning a spout into the channel so that the spout extends an entire length of the channel, the channel extending a majority of length of the bagel product;

(b) moving at least one of the bagel product and the spout relative to each other in a withdrawing direction to leave a portion of the channel free of the spout;

(c) filling the portion of the channel with foodstuff by injecting the foodstuff through a dispensing end of the spout so that the foodstuff fills the portion of the channel; and (d) separating the filled bagel product from the spout by moving at least one of the bagel product and the spout relative to each other in a withdrawing direction.

2. A method as in claim 1, wherein the channel extends by a distance, steps (a) and (b) taking place in stages each involving relative movement between the bagel product and the spout by a withdrawing distance that is smaller in dimension than that of the distance of the channel, further comprising the step of pausing long enough at each of the stages to complete filling with the foodstuff of that portion of the channel defined by the withdrawing distance.

3. A method as in claim 1, further comprising before carrying out steps (a), (b) and (c), the steps of breaking the outer surface to provide an opening to the softer interior opening; and pushing aside the softer interior from the opening with the spout to define said channel within the softer interior and thereby shroud the spout with the bagel product by moving at least one of the bagel product and the spout relative to each other in a shrouding direction that is opposite in direction to that of the withdrawing direction.

4. A method as in claim 3, wherein the step of breaking is carried out with an inclined tip at the end of the spout.

5. A method as in claim 4, wherein the spout is elongated, the inclined tip having an angle of inclination of at least thirty degrees relative to a direction of elongation of the spout.

6. A method as in claim 1, wherein a container contains the foodstuff prior to injection, the step of filling including injecting the foodstuff through an opening in said container into the spout and then into the channel, further comprising the step of exchanging the container with a further container that contains different foodstuff in accordance with a customer's request for a particular kind of filling.

7. A method as in claim 4, wherein said inclined tip of said spout is sufficiently inclined so that an accumulated amount of the foodstuff remaining at the end of said spout after step (c) is too low to spread onto an exterior of a further bagel product upon shrouding of said spout with the further bagel product.

8. A method as in claim 1, wherein said spout is curved so that the foodstuff changes direction within the spout during the injecting.

9. A method as in claim 1, wherein the channel is formed by breaking the outer surface of the bagel product, and inserting the spout through the broken outer surface and into the bagel product to push aside the softer interior until reaching a distance that is the same as that desired for the entire length of the channel.

\* \* \* \* \*